(12) United States Patent
Henning (10) Patent No.: US 7,251,955 B2
(45) Date of Patent: Aug. 7, 2007

(54) SOLID SORPTION HEAT PUMP

(75) Inventor: Hans-Martin Henning, Freiburg (DE)

(73) Assignee: Sortech, AG, Freiburg (DE)

( * ) Notice: Subject to any disclaimer, the term of this patent is extended or adjusted under 35 U.S.C. 154(b) by 171 days.

(21) Appl. No.: 10/511,673

(22) PCT Filed: Apr. 15, 2003

(86) PCT No.: PCT/EP03/03880

§ 371 (c)(1),
(2), (4) Date: Apr. 15, 2005

(87) PCT Pub. No.: WO03/087682

PCT Pub. Date: Oct. 23, 2003

(65) Prior Publication Data

US 2006/0101847 A1    May 18, 2006

(30) Foreign Application Priority Data

Apr. 18, 2002  (DE) ................................ 102 17 443

(51) Int. Cl.
  *F25B 17/08* (2006.01)
(52) U.S. Cl. .................. 62/480; 62/101; 62/324.1
(58) Field of Classification Search .................. 62/480, 62/324.1, 101, 141, 476, 477
See application file for complete search history.

(56) References Cited

U.S. PATENT DOCUMENTS

| | | | | |
|---|---|---|---|---|
| 1,833,901 A * | 12/1931 | Hull | ............................ | 62/335 |
| 4,183,227 A * | 1/1980 | Bouvin et al. | ................ | 62/480 |
| 4,694,659 A | 9/1987 | Shelton | ....................... | 62/106 |
| 5,168,708 A | 12/1992 | Siegel | .............................. | 62/4 |
| 6,102,107 A | 8/2000 | Dunne | ................... | 165/104.12 |

FOREIGN PATENT DOCUMENTS

| | | |
|---|---|---|
| DE | 585 880 | 9/1933 |
| DE | 40 19 669 A1 | 3/1991 |
| DE | 44 05 669 A1 | 8/1995 |
| DE | 199 02 695 A1 | 7/1999 |
| DE | 198 34 696 A1 | 2/2000 |
| DE | 199 61 629 A1 | 6/2000 |
| DE | 100 38 636 A1 | 2/2001 |
| EP | 0 892 225 A2 | 7/1998 |
| EP | 1 150 077 A1 | 3/2001 |
| FR | 2 539 854 | 7/1984 |
| FR | 2604100 | 9/1986 |
| GB | 2 125 154 A | 2/1984 |

* cited by examiner

*Primary Examiner*—Melvin Jones
(74) *Attorney, Agent, or Firm*—Ohlandt, Greeley, Ruggiero & Perle, L.L.P.

(57) ABSTRACT

A solid sorption heat pump is provided that includes an adsorber/desorber unit including a heat exchanger and a solid sorption material. The adsorber/desorber unit is placed in a common housing, which is sealed against the outside atmosphere, together with a condenser/evaporator unit, and the adsorber/desorber unit and the condenser/evaporator unit are separated from one another by an adsorbant-permeable element. The adsorber/desorber unit includes a thermoconductive absorbent holding body, which is connected in a thermoconductive manner to the heat exchanger. The absorbant holding body holds the sorption material, and provides stability to the adsorber/desorber unit. The interior of the common housing is subjected to the action of a negative pressure. The common housing is provided as a thin-walled sheet metal sheathing that is placed on the absorbent holding body, whereby diverting the collapsing forces generated by the negative pressure to the holding body and/or to the heat exchanger and to the condenser/evaporator unit.

22 Claims, 6 Drawing Sheets

SOLID SORPTION HEAT PUMP

CROSS-REFERENCE TO RELATED APPLICATIONS

The present application is a U.S. national stage entry under 35 U.S.C. 371, of International Application No. PCT/EP03/03880, filed Apr. 15, 2003. Priority in the International Application is claimed from German Patent Application No. 102 17 443.1, filed Apr. 18, 2002. The content of the above references is herein incorporated by reference.

BACKGROUND OF THE INVENTION

1. Field of the Invention

The invention relates to a solid sorption heat pump and a heating system with a solid sorption heat pump.

2. Description of the Related Art

It is known to use thermally driven heat pumps on the basis of solid sorption for heating and cooling purposes. Conventional pairs of working materials (namely sorption material and adsorbate) are zeolite and water for example, with the water as the working gas being operated in the low-pressure range. Adsorption heat pumps with such a pair of working materials have been disclosed for example in DE 199 61 629 and DE 100 38 636.

Pairs of working materials have become known which are operated in the high-pressure range. Examples are salt ammines/ammonia, as are disclosed in the U.S. Pat. No. 4,694,659 for example.

Different technical requirements are placed on solid absorption heat pumps. Especially relevant are the demands for a high heat ratio, a high power density and a simple controllability of the heat emission. The heat ratio of the available heat to the drive heat (also known as COP: Coefficient of Performance) depends essentially on the shares of the sorptive and the sensitive heat transformation during a heat pump cycle. Sorptive transformation shall be understood as the release of the sorption heat arising during the adsorption of the working gas or the absorption of the sorption heat required for desorption, whereas the sensitive heat transformation describes the energy transformation occurring during the heating or cooling of the entire system.

If one assumes ideally that the sensitive heat is negligibly small, the maximum possible heat ratio will be achieved with a certain pair of working materials. For silica gel/water this is typically at approximately 180% for a single-state heat pump. This percentage rate is composed of 100% of available heat which is gained from the drive heat, with simultaneous complete desorption of the adsorbate. The second share of 80% can be emitted in form of available heat, in the subsequent cooling of the adsorber and the adsorption of the adsorbate in the sorption material.

In order to achieve especially high heat ratios, systems were developed which became more and more sophisticated in a thermodynamic respect. The highest possible heat recovery which improves the ratio between sorptive and sensitive transformation is desired especially by arranging a plurality of adsorbers or desorbers which are flowed through successively by the heat transfer medium and are switched in a plurality of cycles. The disadvantageous aspect in these systems are the considerable technical effort, the susceptibility to malfunctions and the high production and maintenance costs.

The published application DE 199 02 695 A1 shows a sorption heat pump in which an adsorber/desorber heat pump is arranged together with an evaporator and a condenser in a common vacuum-tight container, which are all integrated in an evaporator/condenser heat exchanger.

SUMMARY OF THE INVENTION

The invention is based on the object of providing a solid absorption heat pump with a high heat ratio and a heating system which is improved with respect to the state of the art.

This object is achieved by a solid absorption heat pump or a heating system according to the independent claims. The dependent claims describe especially advantageous embodiments.

The inventor has recognized that although the conventional solid sorption pumps are improved with respect to the thermodynamic process by cascade-like connection of several adsorbers or desorbers, additional capacities and thermal losses are introduced at the same time into the entire system by the necessary installation of tubes, valves and pumps for the inner heat exchange, which losses reduce the efficiency of the heat recovery. The heat pump in accordance with the invention is characterized by an especially simple configuration which on the one hand reduces the production costs and considerably decreases the susceptibility to malfunctions. On the other hand, the heat capacity of the entire apparatus can be kept at an exceptionally low level by the configuration in accordance with the invention, so that the sensitive heat transformation occurs at a respectively low level.

In the case of a solid sorption heat pump in accordance with the invention, an adsorber/desorber unit and a condenser/evaporator unit are arranged in a common housing and mutually separated by an adsorptive-permeable element. In the gas phase the working material is designated as adsorptive and in the adsorbed liquid phase as the adsorbate. One could therefore generally also refer to a vapour-permeable element. The housing is sealed against the ambient environment.

The adsorber/desorber unit comprises a heat exchanger for transmitting heat from a heat transfer medium which flows through the heat exchanger onto the solid sorption material or from the solid sorption material to the heat transfer medium.

Evaporator and condenser of the solid sorption heat pump in accordance with the invention are designed as one component (a condenser/evaporator unit). The condenser/evaporator unit allows on the one hand condensing the vapour adsorptive and transferring the condensation heat to a heat transfer medium for forwarding to a heating device and on the other hand supplying heat from a low-temperature source to the liquid working material for evaporation.

The condenser/evaporator unit is advantageously arranged in a common housing below the adsorber/desorber unit and the adsorptive-permeable element is arranged as a vapour-permeable sponge which has the function of a spacer in the vapour passages. The use of a ceramic sponge as an adsorptive-permeable element is especially suitable.

In order to achieve a configuration with an especially low thermal capacity in accordance with the invention, the adsorber/desorber unit comprises a heat-conductive absorbing body which is in heat-conductive connection with the heat exchanger. The absorbing body fulfils two functions, namely the heat transmission between heat exchanger and sorption material on the one hand and the production of a stable structure of the adsorber/desorber unit on the other hand. This stable structure allows providing the wall of the common housing with an especially thin configuration because this module no longer needs to provide the sorption heat pump with additional stability. Instead, it is merely used for sealing the inner space with the adsorber/desorber unit and the condenser/evaporator unit against the ambient environment. The outside wall can be designed as a sheet metal sheathing with a wall thickness of 0.5 millimetres or less, especially of 0.1 to 0.5 millimetres which is placed from the outside on the adsorber/desorber unit or condenser/evaporator unit or is supported there. Larger wall thicknesses are possible for reasons of welding for example. For example, the wall thickness for this can be 1.5 millimetres or less. The condenser/evaporator unit advantageously also comprises a similar absorption body with the double function of transmitting the heat between the working material and the supplied/removed heat transfer medium and the production of a stable structure.

Two embodiments are especially suitable for the configuration of the absorption body. The first configuration comprises a lamellar construction which is arranged around the heat exchanger of the adsorber/desorber unit. The solid sorption material is introduced between the individual lamellae, such that the highest possible heat transmission from the heat exchanger to the sorption material is achieved. In particular, conventional lamellar heat exchangers can be used, with the lamellae advantageously being arranged in a perpendicular fashion and comprising bores for the vapour transport of the sorption material.

The solid sorption material is introduced in one embodiment as a bulk material between the lamellae of the lamellar construction. If the lamellae are arranged perpendicularly and are provided with bores, the vapour flows substantially horizontally. The conduits which are formed by the bores represent a kind of distributor in order to distribute the vapour evenly in the sorption material (adsorption) or in order to collect the vapour from the sorption material (desorption). The flow resistance of the vapour flow through the bores or through the conduits formed by the bores is comparatively low in comparison with the flow resistance of the vapour flow through the bulk material. The vapour path is therefore advantageously provided as short as possible in order to keep the thus linked flow resistance as low as possible. According to an advantageous embodiment, the bores are spaced with respect to each other or to the piping of the heat exchanger so that the maximum vapour path through the bulk material is approximately 20 mm. Details on the constructional configuration will be explained in closer detail in connection with the enclosed figures.

The second advantageous embodiment of the absorbent body comprises a metal sponge, in the intermediate spaces of which the sorption material is introduced and through which the piping of the heat exchanger is guided. In this embodiment too it is possible that vapour conduits are advantageously introduced into the absorbent body especially by punching. The vapour conduits are advantageously arranged in a distributed manner within the absorbent body, so that the maximum vapour path through the bulk material is 20 mm on introducing the sorption material as bulk material.

In an especially advantageous embodiment it is provided that the heat exchanger of the adsorber/desorber unit and/or the absorbent body of the same is coated with the sorption material. This can occur alternatively or in addition to the introduction of the solid sorption material into the adsorber/desorber unit.

In order to achieve an especially favourable insulation of the solid sorption heat pump against the ambient environment it is possible that the common housing is provided with a two-shell configuration. A heat-insulating material is advantageously introduced in the inner space between the inner and the outer shell, which material is capable of transmitting pressure forces. This allows providing the two shells with especially thin walls, e.g. as a thin sheet metal jacket. Pressure forces can be carried off from the outer shell via the heat-insulating material to the inner shell and further to the absorbent body of the adsorber/desorber unit or the condenser/evaporator unit. The intermediate space between the two shells can be evacuated, i.e. it can be subjected to a negative pressure in order to further increase the insulating effect.

In a second solid sorption heat pump in accordance with the invention, the adsorber/desorber unit and the condenser/evaporator unit are arranged in separate housings. The inner spaces of the two housings are mutually connected through at least one vapour-conductive connection, e.g. by means of one or several pipes. As a result, both the adsorber/desorber unit as well as the condenser/evaporator unit are configured as independent components. Each of these two components comprises an absorbent body which advantageously fulfils two functions, namely on the one hand the heat transmission between heat exchanger and sorption material (adsorber/desorber unit) and the function of the ribs of the heat exchanger of the condenser (condenser/evaporator unit), and on the other hand the production of a stable structure of the individual components. As a result of these stable structures it is possible on the other hand to provide the walls of the housing with an especially thin configuration, e.g. in form of a sheet metal jacket, because the required stability of the individual components is produced by the absorbent body. The walls are merely used for sealing the inner spaces from the ambient environment. Wall thicknesses of 1.5 millimetres or 0.5 millimetres or less, especially of 0.1 to 0.5 millimetres, can be used here. Apart from the separate housing configuration the second embodiment in accordance with the invention can be provided according to the first embodiment.

The heating system in accordance with the invention comprises a heating circulation which is flowed through by a heat transfer medium and to which a high-temperature source is connected from which heat can be transferred onto the heat transfer medium at a predetermined first temperature level. Moreover, a low-temperature source is connected to the heating circulation in order to supply heat to the heat transfer medium at a second temperature level which lies below the first temperature level. A heating device which is used for carrying off heat from the heat transfer medium (e.g. for heating a room or a building) is connected to the heating circulation, with the heat being carried off at a predetermined third temperature level which lies between the first and the second temperature level. A solid sorption heat pump is further connected to the heating circulation which has the described structure in accordance with the invention. The flow path of the heat transfer medium through the heating circulation or through the connected elements can be set by means of a heating circuit distributor or by means of heating circuit valves which are arranged in the heating circulation. The heating circuit distributor or the heating circuit valves are configured and arranged in such a way that advantageously three switching phases can be set. The individual switching phases (desorption phase, adsorption phase and by-pass phase) are described below in this document.

DESCRIPTION OF THE DRAWINGS

The invention is now explained in closer detail by reference to a number of embodiments shown in the drawings, wherein.

DESCRIPTION OF THE INVENTION

Figure 1:
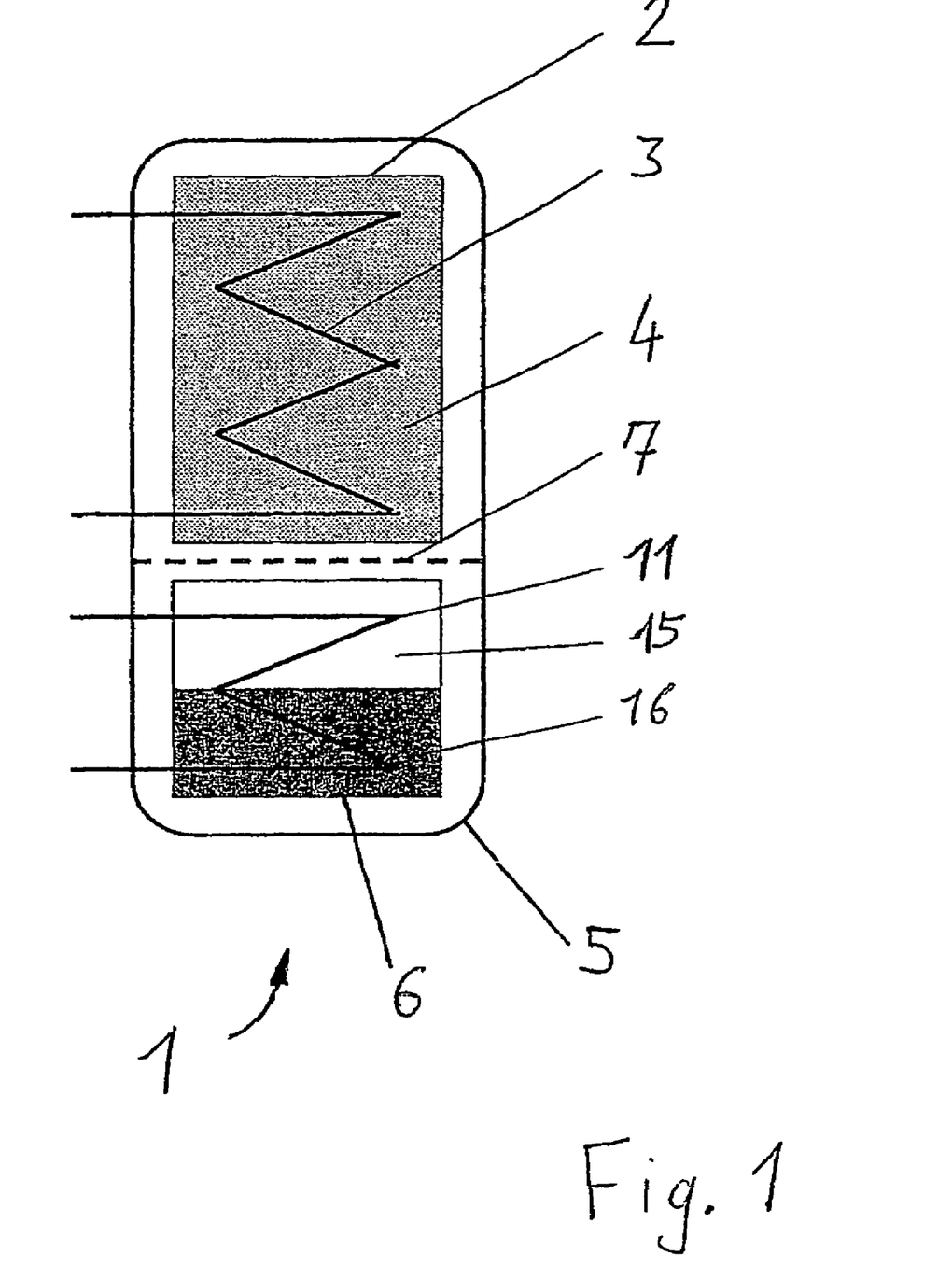
FIG. 1 shows a schematic representation of an embodiment of a solid sorption heat pump according to the present invention.

FIG. 1 shows the basic components of an embodiment of a solid sorption heat pump 1 according to the present invention. An adsorber/desorber unit 2 and a condenser/evaporator unit 6 are arranged adjacent to one another in a common housing 5. The adsorber/desorber unit 2 is arranged above the condenser/evaporator unit 6 and the two units 5, 6 are exclusively separated by an adsorptive-permeable element 7. A heat exchanger 3 is guided through the adsorber/desorber unit 2. The condenser/evaporator unit 6 also comprises a heat exchanger which can also be designated as condensation/evaporation tube 11.

The inner space of the condenser/evaporator unit 6 is divided into a vapour chamber 15 and a condensate chamber 16 as a result of the condensate obtained during the condensation of the working material (adsorptive). The volume of the condenser/evaporator unit 6 is configured in such a way that the condensation/evaporation heat exchanger is not flooded in the case of maximum occurrence of condensate. With respect to the adsorber/desorber unit 2, the maximum required condensate volume depends on the achievable loading width of the heat pump and is typically 15 to 25 percent of the volume of the sorption material.

The adsorptive element 7 is arranged in form of an adversely heat-conductive spacer with vapour conduits. A predetermined distance between the two units 2, 6 can thus be set and they can thermally be insulated to a substantial extent with respect to each other.

The mode of operation of the illustrated solid sorption heat pump shall briefly be described below: Heating heat (e.g. from the burner of a heating system) is supplied in a first phase via the heat exchanger 3 to the adsorber/desorber unit 2. As a result of the heat supply, water vapour is driven at negative pressure out of the sorption material when using a pair of working materials consisting of silica gel and water for example. The vapour-like working material (adsorptive, e.g. water vapour) is condensed in the condenser/evaporator unit 6 and the condensation heat thus obtained is carried off via the condensation/evaporation tube 11 and is used for heating purposes. As a result of the low pressure obtained during the condensation, the adsorptive driven from the sorption material is sucked into the condenser/evaporator unit 6 from the adsorber/desorber unit 2 via the adsorptive-permeable element 7.

After a predetermined time span (e.g. 30 minutes), the first cycle (the desorption cycle) is completed. At this time the adsorbate is ideally fully driven from the sorption material and is present in condensed form (i.e. in liquid phase) in the condenser/evaporator unit 6. As is shown in FIG. 1, a certain liquid level will be obtained in condenser/evaporator unit 6.

The operation of the illustrated solid sorption heat pump is now moved to the second phase (adsorption phase) by switching the respective configuration of the lines in the heat transfer medium circulation. The adsorber/desorber unit 2 (i.e. the heat exchanger 3 of the same) is connected with a heating device, e.g. for heating a room or a building. The condensation/evaporation pipe 11 of the condenser/evaporator unit 6 is connected with a low-temperature source. The adsorber/desorber unit 2 is cooled by emitting heat. The working material is adsorbed again by the sorption material after being previously evaporated in the condenser/evaporator unit 6. This second cycle can also take half an hour for example, but it is especially somewhat longer than the desorption phase. Thereafter the solid sorption heat pump is again in the initial situation again for the first phase, meaning that the adsorbate is ideally completely adsorbed in the sorption material. Adsorption phase and desorption phase thus progress in a cyclic fashion.

Figure 2:
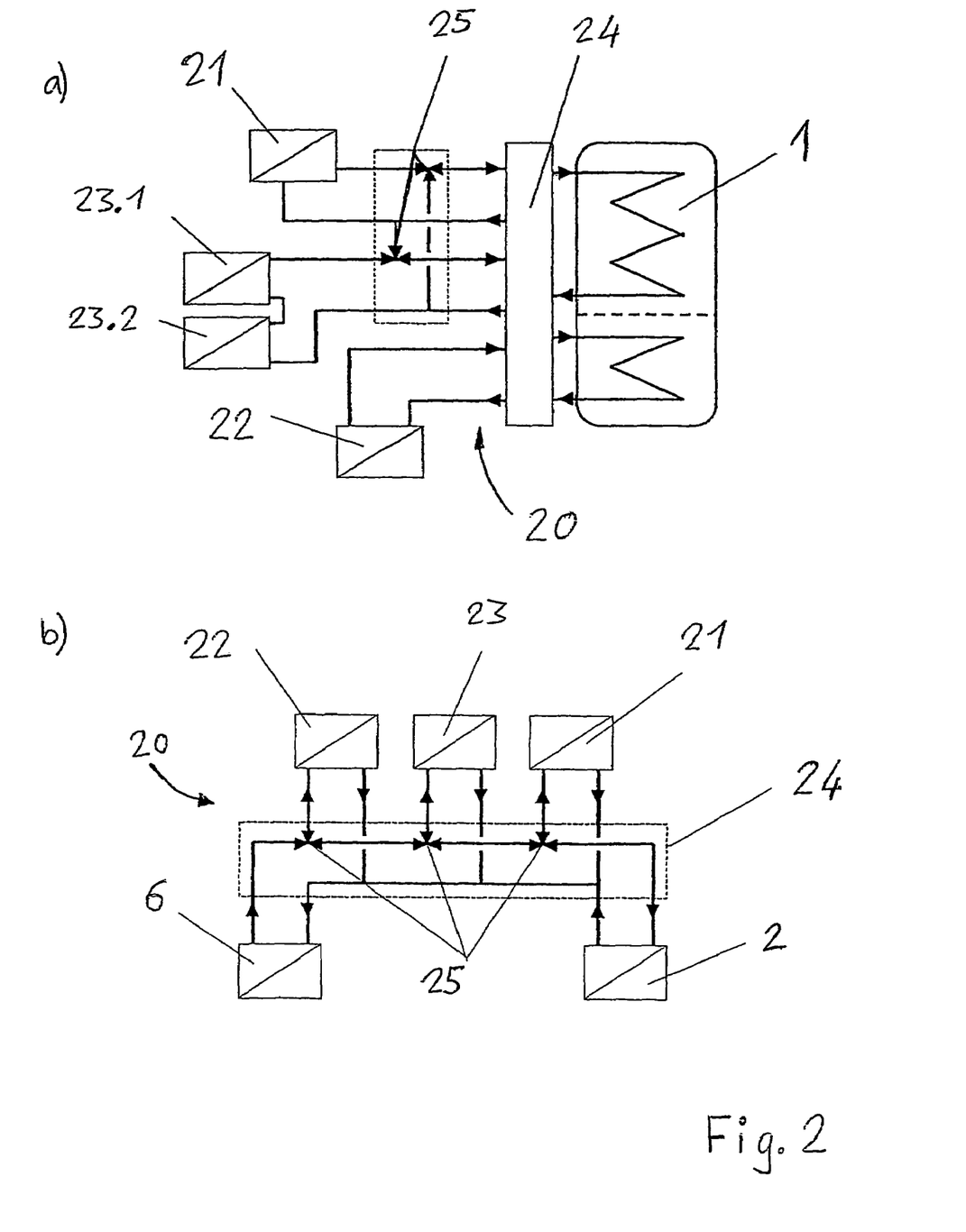
FIG. 2 shows a schematic representation of a heating circulation with a solid sorption heat pump according to an embodiment of the present invention.

FIG. 2 shows the system inclusion of an embodiment of a solid sorption heat pump in accordance with the invention in a heating system. The heating system comprises (as shown in FIG. 2a) a heating circulation 20 to which are connected a solid sorption heat pump, a high-temperature source 21 in form of a burner with a connected heat exchanger, a low-temperature source 22 and a heating device 23 with an waste gas heat exchanger 23.1 and a heating 23.2. The heating circulation 20 includes a heating circuit distributor 24 and heating circuit valves 25 in a by-pass circuit. Three different operating phases can thus be set which are described below.

Any conventional burner which uses gas, oil or other fuels can be used as a burner. Suitable low-temperature sources are especially external air heat exchangers, earth collectors or groundwater. The bypass circuit allows bivalent operation of burner and heat pump (phase 3—by-pass).

The illustrated system inclusion allows combining the heat pump with an oil or gas-operated burner in a manner that both the use of calorific value by condensation of the waste gases and the use of the heat pump can be combined.

For this purpose, two separate heat exchangers are provided for the uncoupling of the heat from the combustion chamber and the condensation of the waste gases. The waste gas heat exchanger 23.1 can be omitted if the use of the thermal energy of the waste gases is not required.

FIG. 2b shows the heating circuit distributor 24 and its possibilities for circuitry are shown again on an enlarged scale. The drawing schematically shows the arrangement of the various elements (high-temperature source 21, low-temperature source 22, heating device 23, adsorber/desorber unit 2 and condenser/evaporator unit 6) and its circuitry in the heating circulation 20 by means of the heating circuit distributor 24. The heating circuit distributor 24 comprises three heating circuit valves 25 which are configured in particular as three-way motor valves.

The shown distributor 24 is configured in such a way that the following switching possibilities (phases) can be set:

Phase 1: Desorption: The high-temperature source 21 is connected by means of a flow circulation of a heat transfer medium with the adsorber/desorber unit 2; the condenser/evaporator unit 6 is connected with the heating device 23 by means of a flow circulation of a heat transfer medium; the low-temperature source 22 is blocked off against the remaining heating circulation.

Phase 2: Adsorption: The high-temperature source 21 is blocked off against the remaining heating circulation; the heating device 23 is connected with the adsorber/desorber unit 2 by means of a flow circulation of a heat transfer medium; the condenser/evaporator unit 6 is connected with the low-temperature source 22 by means of a flow circulation of a heat transfer medium.

Phase 3: By-pass: The low-temperature source 22, the adsorber/desorber unit 2 and the condenser/evaporator unit 6 are blocked off against the remaining heating circulation; the high-temperature source 21 is connected with the heating device 23 by means of a flow circulation of a heat transfer medium.

The switching positions of the individual heat circuit valves 25 for the phases 1 and 2 are coupled with each other. It is also possible to provide a valve block in the heating circuit distributor instead of the separate valves as shown in FIG. 2b.

The cycle time (phase duration) of the sorption heat pump is adjusted to the heat emission of the heating device. Phases 1 and 2 (desorption and adsorption) are each carried out alternatingly until the flow temperature falls below the set value of the heating network as determined by the heating curve. An even emission of heat can thus be ensured even despite the discontinuous operation of the heat pump. The phase 3 (by-pass) is set when as a result of the operating conditions the heat ratio of the heat pump reaches the value one. In this case, the high-temperature source 21 (e.g. a burner) is coupled directly to the heating network, i.e. the heating device 23.

Figure 5:
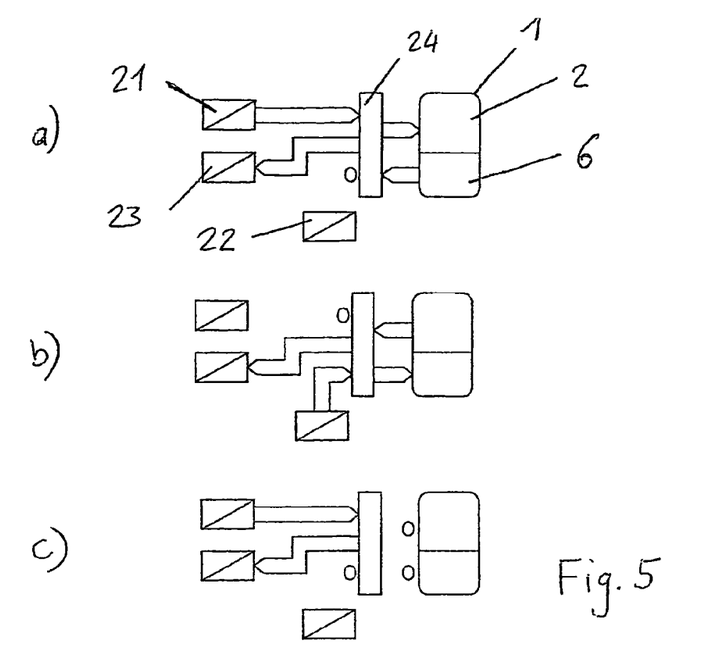
FIG. 5 shows a schematic representation of the heat flows in the different phases of an embodiment of a heating system.

The heat flows in the individual phases 1 to 3 are shown again in FIG. 5. FIG. 5a shows the phase 1 (desorption phase). A heat stream flows from the high-temperature source 21 to the adsorber/desorber unit 2 of the solid sorption heat pump 1. The adsorbate is dissolved by heating the sorption material and it flows in vapour form to the condenser/evaporator unit 6 where it is condensed. The condensation heat is guided by the condenser/evaporator unit 6 in a heat flow to the heating device 23. The low-temperature source 22 is insulated against the heating circulation.

FIG. 5b shows the heat flows in phase 2 (desorption phase). The high-temperature source 21 is insulated from the remaining system, which means the heating circulation. The low-temperature source 22 is connected by means of the heating circuit distributor 24 to the condenser/evaporator unit 6 of the solid sorption heat pump 1 in such a way that a heat stream flows from the low-temperature source 22 to the condenser/evaporator unit 6. The liquid working material is evaporated in the condenser/evaporator unit 6 and flows in vapour form to the adsorber/desorber unit 2 where it settles down on the sorption material. The heat of the adsorber/desorber unit 2 heated in phase 1 is conveyed in a heat stream to the heating device 23. Heat ratios of over 100 percent can be achieved, which means ideally 100 percent of the heating energy of the high-temperature source 21 in phase 1 are transferred to the heating device 23 and a further 80 percent are transferred in phase 2 by the heat stream from the low-temperature source 22 and the adsorption in the solid sorption heat pump 1.

FIG. 5c shows phase 3 (by-pass phase). As is illustrated, the high-temperature source 21 is directly connected with the heating device 23 by means of the heating circuit distributor 24, so that the heat stream flows from the high-temperature source 21 directly to the heating device 23. The solid sorption heat pump 1, i.e. the adsorber/desorber unit 2 and the condenser/evaporator unit 6, as well as the low-temperature source 22 are insulated from the remaining system.

Figure 3:
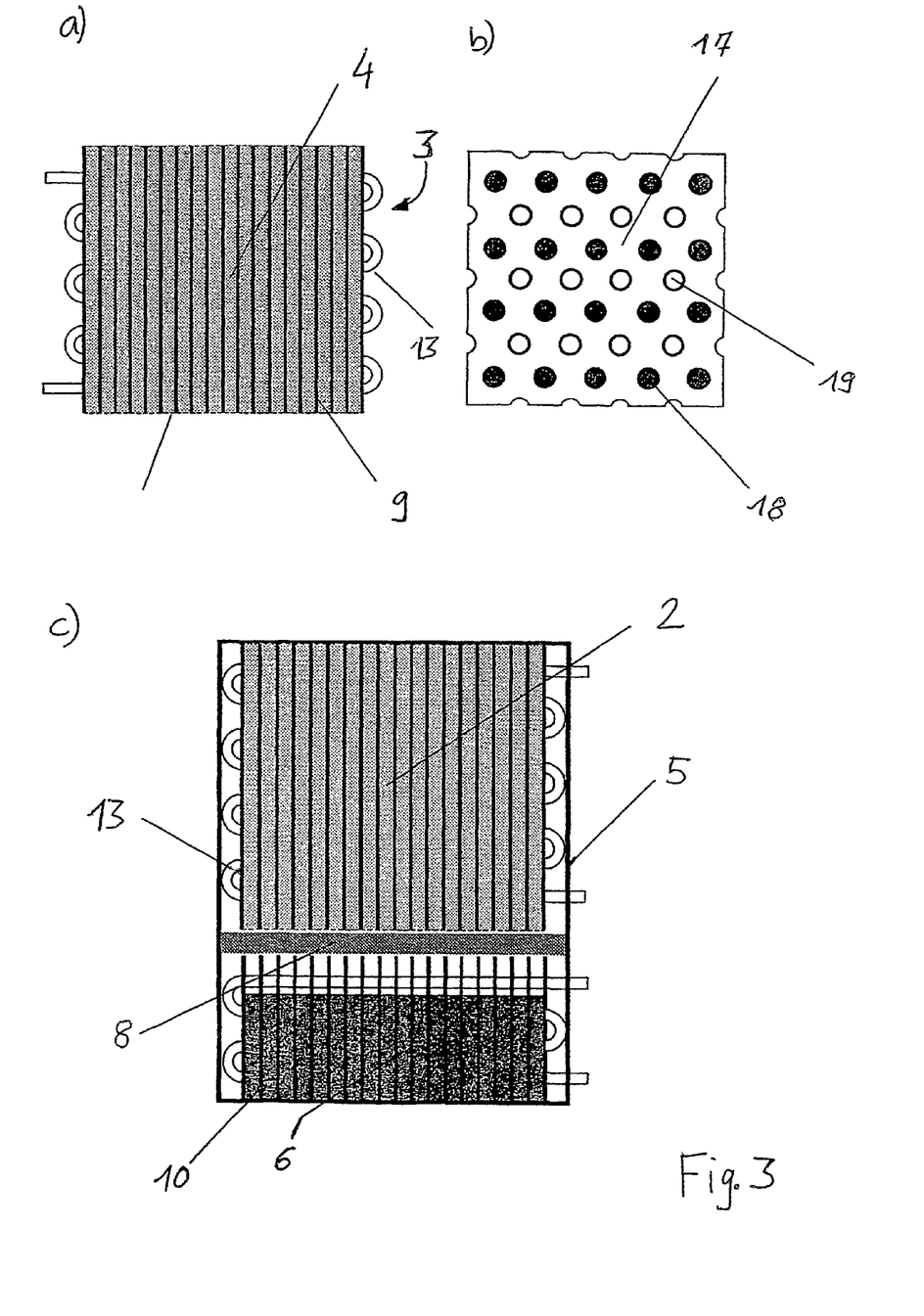
FIG. 3 shows a first embodiment of a solid sorption heat pump with an absorbent body.

FIG. 3 shows a first preferable embodiment of the solid sorption heat pump in accordance with the invention. FIG. 3a shows an adsorber/desorber unit with an absorbent body 9 in lamellar form. The adsorber/desorber unit can also be designed as a lamellar adsorber. FIG. 3a shows a side view of the lamellar adsorber and FIG. 3b shows a view of a individual lamellar blade. A conventional lamellar heat exchanger can be used for example which, as is shown in FIGS. 5a and 5b, is adjusted accordingly.

The solid sorption material 4 is introduced between the lamellae of the absorbent body 9, such that the best possible heat transmission occurs from the heat exchanger via the lamellae to the solid sorption material 4. The heat exchanger comprises horizontal pipe sections which are joined with each other via a baffles 13, so that the heat transfer medium guided in the heat exchanger is guided from a horizontal section via a baffle 13 to the next horizontal section which may be situated underneath for example. The baffles 13 project laterally from the absorbent body 9.

The lamellae of the absorbent body 9 are aligned perpendicularly in order to enable the easy ventilation of the mostly horizontally arranged pipe loops. The individual lamellae comprise openings for the vapour transport which are not filled with pipes. Perforated pipes, plates or wire meshes can be introduced into the openings in order to form vapour conduits. FIG. 3b shows a single lamella blade 17 with heat medium transfer pipes 18 and vapour conduits 19 which are introduced therein. The heat transfer medium pipe 18 is the said horizontal pipe section of the heat exchanger 3 and can be flowed through by water as a heat transfer medium.

The absorbent body 9 is filled with the sorption material. In order to ensure that the material will not pour out, a wire mesh or a perforated plate can be clamped around the same. The lamellae, which are made of copper or aluminium sheet metal, can alternatively or additionally be coated with the sorption material.

The vapour conduits 19 which are shown in FIG. 3b and which are formed by the openings in the individual lamellae not filled with pipes work as distributors (adsorption) or as collectors (desorption) of the vapour. In the adsorption phase the vapour flows from the outside horizontally into the vapour conduits 19 and distributes in the sorption material 4 starting from the vapour conduits 19, which sorption material is introduced as a bulk material between the lamellae. The flow resistance of the vapour in the vapour conduits 19 is exceptionally low in comparison with the flow resistance of the vapour flow through the bulk material.

In order to keep the total flow resistance at a low level, it is therefore advantageous to delimit the maximal vapour path through bulk material to a maximum of 20 millimetres. This can be achieved by a predetermined distribution of the bores in the lamellae.

The maximum vapour path through the bulk material is obtained by the distance which is covered by the vapour starting from a bore in a lamella or from vapour conduit 19 radially to the outside. In order to limit this distance to approximately 20 millimetres, the distance between a vapour conduit 19 and the adjacent pipes is 25 millimetres or less according to an advantageous embodiment. Preferably, conventional lamellae are connected in such a way that only every second perforated row is filled with a pipe and the free rows of holes are provided with a inserted cylindrical wire mesh (alternatively with perforated pipes or plates) in order to form the vapour conduits 19. The inserted cylindrical wire mesh advantageously consists of the same material as the lamella in order to prevent contact corrosion. The vapour conduits 19 are kept free from the bulk material of the sorption material 4 by the inserted cylindrical wire mesh in order to thus keep the flow resistance of the vapour in the vapour conduits 19 at a low level.

In the desorption phase, the respectively configured vapour conduits 19 collect the adsorptive released from the sorption material, which adsorptive passes at most over the distance which corresponds to one radius of the catchment range around an individual vapour conduit.

FIG. 3c shows the complete solid sorption heat pump 1 with an absorbent body 9 according to FIGS. 3a and 3b. As can be seen, the condenser/evaporator unit 6 also comprises a respectively configured absorbent body 10. One could also call the condenser/evaporator unit a lamellar evaporator/condenser.

The adsorber/desorber unit 2 and the condenser/evaporator unit 6 are arranged in a common housing 5 and are mutually separated by a ceramic sponge 8. The common housing consists of a thin plate which encloses the two elements. The mechanical stability of the plate is ensured by the support of the edges of the heat exchanger 3 in the region of the pipe baffles 13.

The distance between the adsorber/desorber unit and the condenser/evaporator unit is ensured by the ceramic sponge 8 which has a low thermal conductivity, but offers sufficient vapour permeability and stability. The vapour transport, i.e. the flow of the adsorptive, between the adsorber/desorber unit 2 and the condenser/evaporator unit 6 extends in the region of the pipe baffles 13 of the lamellar heat exchanger. The sheet metal sheathing is provided in a vacuum-tight manner against the ambient environment.

The embodiment as shown in FIG. 3 allows providing the entire solid sorption heat pump with a low thermal capacity due to the simple configuration with few pipes and low wall thickness, which thus allows achieving an especially high heat ratio.

Figure 4:
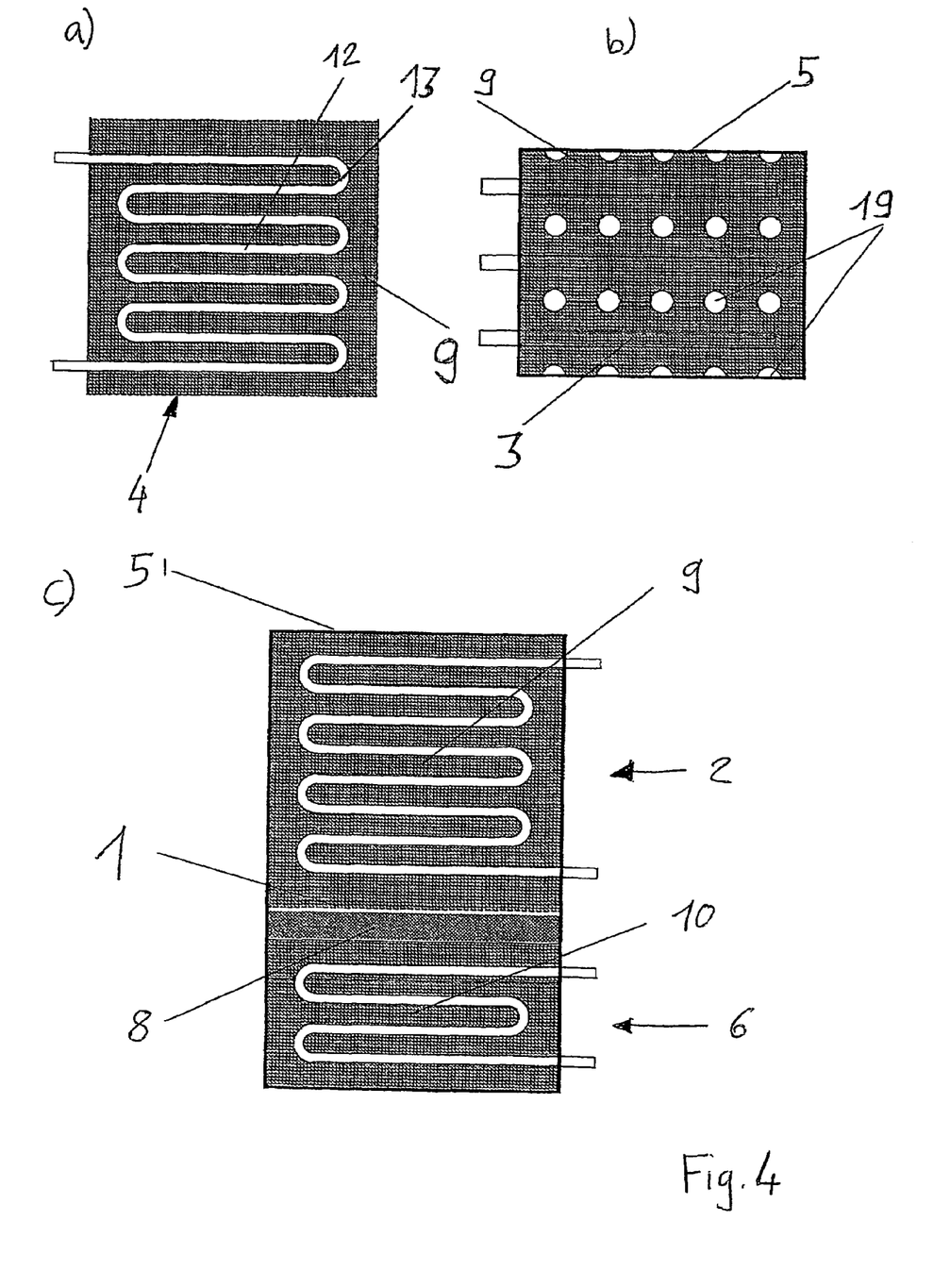
FIG. 4 shows second embodiment of a solid sorption heat pump with an absorbent body.

FIG. 4 shows a second embodiment of a solid sorption heat pump with an absorbent body. The absorbent body 9 of the adsorber/desorber unit 2 as shown in FIGS. 4a and 4b is arranged as a metal sponge. The metal sponge is used for heat transmission between the heat transfer medium guided in the heat exchanger 3 and the sorption material. The metal sponge is provided with an open-pore configuration and is filled or coated with sorption material. The metal sponge can be enclosed by a wire mesh or perforated sheet metal in order to prevent the sorption material from pouring out.

The piping of the heat exchanger 3 is introduced into the metal sponge. The connection between metal sponge and piping is favourably thermally conductive, which can be achieved in particular by sealing or soldering in the pipe.

As is shown in FIG. 4b, additional vapour conduits 19 can be punched into the metal sponge.

The heat exchanger 3 can be made of horizontal pipe sections 12 which are joined with each other through baffles 13. As is shown in a top view of FIG. 4b, a heat exchanger which comprises three pipe loops arranged vertically adjacent to each other is introduced in this embodiment into the metal sponge. The metal sponge can preferably be made of a three cuboid-like sections, with one introduced pipe section each which are arranged flush relative to each other in the common housing 5. This allows in an especially simple way to introduce the vapour conduits 19 into the absorbent body 9, i.e. the metal sponge. It is understood that it is also possible to segment the metal sponge in such a way that the pipes of the heat exchanger 3 can be inserted between two adjacent segments.

The vapour conduits can be provided with perforated pipes, plates or wire meshes in order to prevent the solid sorption material 4 from pouring out.

FIG. 4c shows a complete solid sorption heat pump 1 with an adsorber/desorber unit 2 which comprises an absorbent body 9 which is configured as a metal sponge, and a condenser/evaporator unit 6 with an absorbent body 10 which is also accordingly configured as a metal sponge, in a common housing 5. The two units 2, 6 are arranged adjacent to one another and above one another and are separated from each other merely by a ceramic sponge 8. The common housing 5 consists of a thin sheet metal, preferably with a wall thickness of 0.1 to 0.5 mm which is placed on the edges of the absorbent bodies 9 and 10 and the interposed ceramic sponge 8. The mechanical stability of the sheet metal is produced by placing on the metal sponges or the ceramic sponge, so that the sheet metal per se can be provided with a statically unstable configuration. This allows especially thin wall thicknesses, which consequently leads to an especially low thermal capacity of the entire solid sorption heat pump.

The vapour transport between adsorber/desorber unit 2 and condenser/evaporator unit 6 extends through the ceramic sponge and into the vapour conduits 19 which are introduced into the adsorber/desorber unit 2.

As is shown, the condenser/evaporator unit 6 is provided below the adsorber/desorber unit 2 and is provided with a height which is at least as large as the maximum filling level with obtained condensate.

Figure 6:
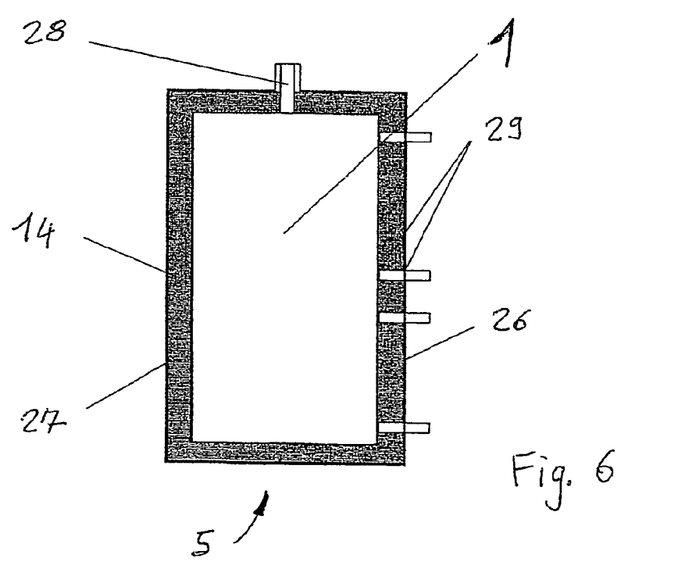
FIG. 6 shows a common housing for a solid sorption heat pump according to the present invention with an especially favourable thermal insulation.

FIG. 6 shows a preferable embodiment of the common housing 5. The solid sorption heat pump 1 is switched in the inner space, which pump is not shown in the illustration per se. The housing 5 is provided with a double shell, comprising an inner shell which is preferably made of a thin sheet metal and an outer shell which is preferably also made of a thin sheet metal.

A granulate bulk material 14 is preferably introduced into the intermediate space between the two shells, i.e. between the inner sheet metal sheathing 26 and the outer sheet metal sheathing 27, which bulk material has such a mechanical stability that it will transmit pressure forces between the two sheet metal sheathings 26, 27. This allows transmitting these occurring forces inwardly onto the absorbent bodies shown in an exemplary fashion in the preceding figures or onto the heat exchanger pipes. The sheet metal sheathings 26 and 27 can thus also be provided with an especially low wall thickness in order to keep low the capacity of the solid sorption heat pump 1.

An evacuation nozzle 28 is connected to the illustrated housing which is provided with a two-part configuration by engagement of an inner pipe in an outer pipe. It is understood that it is also possible to provide separate nozzles. The evacuation nozzle 28 can be used to evacuate both the inner space of the solid sorption heat pump 1 as well as the intermediate space between the two shells of the housing 5. This evacuation of the inner space of the solid sorption heat pump 1 is used for setting a predetermined pressure according to the requirements of the employed working pair. The evacuation of the intermediate space in housing 5 is used for optimal heat insulation.

The pipe ducts 29 for the heat exchangers of the adsorber/desorber unit and condenser/evaporator unit are shown at the side in housing 5.

Silica gel, perlite or foam glass pearls can be used for example as insulating material which is introduced between the two shells of the housing 5.

Figure 7:
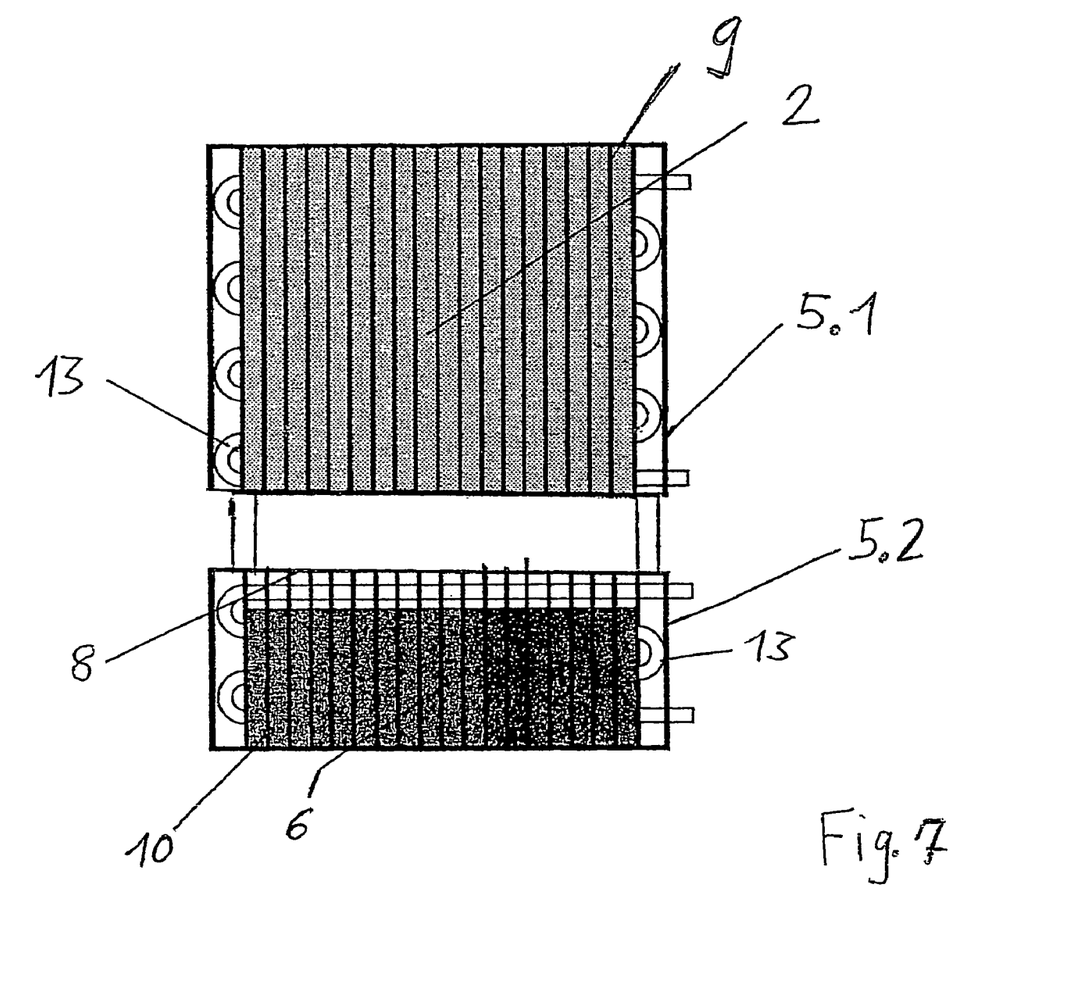
FIG. 7 shows an embodiment in accordance with the invention with an adsorber/desorber unit and a condenser/evaporator unit in separate housings.

FIG. 7 shows a second embodiment of the present invention. In this embodiment, the adsorber/desorber unit 2 and the condenser/evaporator unit 6 are arranged in separate housings 5.1 and 5.2. The inner spaces of the two housings 5.1 and 5.2 are mutually connected by piping with each other for example, as is illustrated. As can be seen, each of the housings 5.1 and 5.2 is configured as a thin sheet metal sheathing which is placed on the absorbent body 9 and 10, with the exception of regions in which the baffles 13 are provided on which the sheet metal sheathings are placed there. It is naturally possible to arrange the two modules (namely the adsorber/desorber unit 2 and the condenser/evaporator unit 6) separate from each in any desired way as long as suitable connecting lines ensure the vapour flow between the two modular units.

The embodiments shown in the drawings show different advantages. A particularly simple compact arrangement can thus be achieved. An especially low specific thermal capacity can be achieved by using a sheet metal sheathing as a vacuum container and thus a high heat ratio without inner heat recovery. The use of vacuum super-insulated heat insulation in a double-wall container is possible. Moreover, a slight adjustment of the discontinuous heat pump operation to the heating requirement is possible through variable cycle duration. This helps avoid external buffer storages as are frequently used in conventional, thermally driven heat pumps.

LIST OF REFERENCE NUMERALS

1 Solid sorption heat pump
2 Adsorber/desorber unit
3 Heat exchanger
4 Solid sorption material
5 Housing
6 Condenser/evaporator unit
7 Adsorptive-permeable element
8 Ceramic sponge
9 Absorbent body
10 Absorbent body
11 Condensation/evaporation pipe
12 Pipe section
13 Baffle
14 Granulate bulk material
15 Vapour chamber
16 Condensate chamber
17 Lamellar blade
18 Heat medium transfer pipe
19 Vapour conduit
20 Heating circulation
21 High-temperature source
22 Low-temperature source
23 Heating device
23.1 Waste gas heat exchanger
23.2 Heating
24 Heating circuit distributor
25 Heating circuit valve
26 Inner sheet metal sheathing
27 Outer sheet metal sheathing
28 Evacuation nozzle
29 Pipe duct

The invention claimed is:

1. A solid sorption heat pump comprising: an adsorber/desorber unit having a heat exchanger and a solid sorption material; condenser/evaporator unit;
a common housing in which the adsorber/desorber unit and the condenser/evaporator unit are arranged together, wherein the common housing is sealed against the ambient environment; and an adsorptive-permeable element for separating the adsorber/desorber unit and the condenser/evaporator unit, wherein the adsorber/desorber unit includes a heat-conductive absorbent body that is arranged in a heat-conductive connection with the heat exchanger, wherein the absorbent body receives the sorption material, wherein the absorbent body provides stability to the adsorber/desorber unit, and wherein the common housing has an inner unit that is subjected to a negative pressure and the common housing is arranged as a thin-walled sheet metal sheathing which is placed on the absorbent body so that collapsing forces produced by the negative pressure on a component selected from the group consisting of the absorbent body, the heat exchanger, the condenser/evaporator unit, and any combinations thereof, are carried off.

2. The solid sorption heat pump according to claim 1, wherein the condenser/evaporator unit is arranged in the common housing beneath the adsorber/desorber unit.

3. The solid sorption heat pump according to claim 1, wherein the adsorptive-permeable element is a vapour-permeable sponge that produces a predetermined distance between the adsorber/desorber unit and the condenser/evaporator unit.

4. The solid sorption heat pump according to claim 1, wherein the condenser/evaporator unit includes an additional absorbent body, wherein the additional absorbent body receives condensation/evaporation pipes through which a heat transfer medium flows, and wherein the heat transfer medium carries off condensation heat, supplies evaporation heat and provides stability to the condenser/evaporator unit.

5. The solid sorption heat pump according to claim 1, wherein the absorbent body is selected from the group consisting of a lamellar construction and a metal sponge.

6. The solid sorption heat pump according to claim 4, wherein the common housing is placed on the absorbent body, the additional absorbent body, and on sections of the heat exchanger and the condensation/evaporation pipes so that collapsing forces produced by the negative pressure on a component selected from the group consisting of the absorbent body, the heat exchanger, the condensation/evaporation pipes, and any combinations thereof, are carried off.

7. The solid sorption heat pump according to claim 4, wherein the heat exchanger and the condensation/evaporation pipes are each arranged as at least one pipe loop, wherein each pipe loop has a plurality of horizontally arranged pipe sections that are joined with each other at their horizontal ends by baffles so as to guide the heat transfer medium.

8. The solid sorption heat pump according to claim 7, wherein the sheet metal sheathing is placed on the baffles from the outside.

9. The solid sorption heat pump according to claim 1, wherein a component selected from the group consisting of the supporting body, the heat exchanger of the adsorber/desorber unit, and a combination thereof is coated with the solid sorption material.

10. The solid sorption heat pump according to claim 1, wherein the common housing is a two-shell housing whose intermediate space is filled between shells of the two-shell housing with a pressure-force-transmitting, heat-insulating material, wherein an intermediate space between the shells is evacuated.

11. A solid sorption heat pump comprising: an adsorber/desorber unit having a heat exchanger and a solid sorption material; and a condenser/evaporator unit, wherein the adsorber/desorber unit includes a heat-conductive absorbent body that is in a heat-conductive connection with the heat exchanger, wherein the absorbent body receives the sorption material, wherein the absorbent body provides stability to the adsorber/desorber unit, wherein the condenser/evaporator unit includes an additional heat-conductive absorbent body that receives condensation/evaporation pipes through which a heat transfer medium flows, wherein the heat transfer medium carries off condensation heat, supplies evaporation heat, and provides stability to the condenser/evaporator unit, wherein the adsorber/desorber unit is arranged in a first housing sealed from the ambient environment and the condenser/evaporator unit is arranged in a second housing sealed from the ambient environment, wherein inner spaces of the first and second housings are subjected to a negative pressure and are joined with each other by at least one vapour-conducting connection, and wherein the first and second housings are thin-walled sheet-metal sheathings that are placed on the absorbent body and the additional absorbent body so that the collapsing forces produced by the negative pressure on a component selected from the group consisting of the absorbent body, the additional absorbent body, the heat exchanger, the condensation/evaporation pipes, and any combinations thereof, are carried off.

12. The solid sorption heat pump according to claim 11, wherein the absorbent body and the additional absorbent body are each selected from the group consisting of a lamellar construction and a metal sponge.

13. The solid sorption heat pump according to claim 11, wherein the heat exchanger and the condensation/evaporation pipes are each arranged as at least one pipe loop, wherein each pipe loop has a plurality of horizontally arranged pipe sections that are connected with each other at their horizontal ends by baffles so as to guide the heat transfer medium.

14. The solid sorption heat pump according to claim 13, wherein the sheet metal sheathings are placed on the baffles from the outside.

15. The solid sorption heat pump according to claim 11, wherein the supporting body and/or the heat exchanger of the adsorber/desorber unit is/are coated with the solid sorption material.

16. The solid sorption heat pump according to claim 11, wherein the first and second housings are double-shell housings whose intermediate spaces between shells of the double-shell housings are filled with a pressure-force-transmitting, heat-insulating material, and wherein intermediate spaces between the shells are evacuated.

17. A heating system comprising: a heating circuit; a heat transfer medium that flows through the heating circuit; a high-temperature source that is connected to the heating circuit for supplying heat to the heat transfer medium at a predetermined first temperature level; a low-temperature source that is connected to the heating circuit for supplying heat to the heat transfer medium at a predetermined second temperature level which is lower than the first temperature level; a heating device that is connected to the heating circuit for removing heat from the heat transfer medium to a predetermined third temperature level which lies between the first and second temperature levels; a solid sorption heat pump according to claim 1 which is connected to the heating circuit; and at least one of a heating circuit distributor and at least one heating circuit valve which is connected to the heating circuit for selectively setting the flow of the heat transfer medium through the heating circuit.

18. The heating system according to claim 17, wherein the at least one of the heating circuit distributor and the at least one heating circuit valve is adjustable for three switching phases wherein the three switching phases are a first switching phase for producing a first flow circulation of the heat transfer medium between the high-temperature source and the adsorber/desorber unit and a second flow circulation of the heat transfer medium between the condenser/evaporator unit and the heating device, a second switching phase for setting a first flow circulation of the heat transfer medium between the heating device and the adsorber/desorber unit and a second flow circulation of the heat transfer medium between the low-temperature source and the condenser/evaporator unit, and a third switching phase for setting a flow circulation of the heat transfer medium between the high-temperature source and the heating device.

19. The solid sorption heat pump according to claim 3, wherein the vapour-permeable sponge is a ceramic sponge.

20. The solid sorption heat pump according to claim 4, wherein the additional absorbent body is similar to the absorbent body of the adsorber/desorber unit.

21. The solid sorption heat pump according to claim 10, wherein the pressure-force-transmitting, heat-insulating material is a granulate bulk material.

22. The solid sorption heat pump according to claim 16, wherein the pressure-force-transmitting, heat-insulating material is a granulate bulk material.

* * * * *